United States Patent Office 3,462,380 Patented Aug. 19, 1969

3,462,380

SUSPENSION POLYMERIZATION PROCESS FOR VINYL ARYL MONOMERS

Clifford P. Ronden and John Yu, Edmonton, Alberta, Canada, assignors to The Dow Chemical Company, Midland, Mich., a corporation of Delaware No Drawing. Filed Mar. 24, 1966, Ser. No. 536,959
Int. Cl. C08f *1/11, 47/10*
U.S. Cl. 260—2.5 7 Claims

ABSTRACT OF THE DISCLOSURE

This is a process for making vinyl aromatic polymer beads in an aqueous suspension containing a mixture of finely divided basic zinc carbonate and zinc hydroxide prepared in situ at temperatures between 100° F. and 212° F.

This invention concerns a process for making polymer beads in aqueous suspension. It relates more particularly to the suspension polymerization of vinyl aryl monomers, e.g. styrene, in aqueous media stabilized with a combination of inorganic difficultly water soluble zinc compounds.

It is known that bead polymers of polymerizable ethylenic monomers can be obtained by polymerizing the monomer in an aqueous medium in the presence of a dispersing agent which helps to keep the globules of monomer dispersed. Among dispersing agents known to be useful for such purpose, are the difficultly soluble phosphates such as calcium phosphate, barium phosphate, magnesium phosphate, aluminum phosphate, calcium carbonate, magnesium carbonate, zinc oxide, and hydroxyapatite, $3Ca_3(PO_4)_2 \cdot Ca(OH)_2$. It is also known that the effectiveness of the phosphate agents is extended by the use of anionic surface active agents, and especially when the phosphate is employed in "submicron" size, i.e. in the form of particles having a diameter between 0.2 and 0.005 micron.

It has now been discovered that polymer beads can readily be obtained by polymerizing a vinyl aryl monomer in an aqueous suspension stabilized with a mixture of "hot-precipitated" basic zinc carbonate and zinc hydroxide, prepared by reaction in an aqueous solution, of an alkali carbonate with an excess of an inorganic water soluble zinc salt and of an alkali hydroxide, as more fully hereinafter described.

The exact composition of the basic zinc carbonate in the aqueous medium is not known. A number of basic zinc carbonates and their formulae are reported in J.W. Mellor, vol. IV p. 465, 1923. The term "basic zinc carbonate" employed herein is intended to include any of the basic zinc carbonates obtained by the hot-precipitation method described herein.

The basic zinc carbonate is prepared in aqueous solution by dissolving a desired amount of an alkali carbonate such as ammonium carbonate, sodium carbonate, or potassium carbonate, in water, usually as a dilute solution of from about 0.5 to 5 percent concentration. The solution is stirred and heated at elevated temperatures of from 100° F. to 212° F., preferably from 130° F. to 200° F. Thereafter, a solution of a water soluble zinc salt such as zinc nitrate, zinc chloride, zinc sulfate, zinc bromide, zinc chlorate, zinc ammonium sulfate, zinc bromate, or zinc iodide, suitably in a concentration of from 10 to 50 percent by weight, is added rapidly to the vigorously stirred hot, dilute, alkali carbonate solution, and in an amount corresponding to from about 1.5 to 2.5 chemically equivalent proportions of the zinc salt per gram molecular proportions of the alkali carbonate. Almost immediately, e.g. within a period of from about 5 to 15 minutes thereafter, there is added to the hot stirred suspension of the precipitated zinc carbonate, an aqueous solution of an alkali hydroxide such as ammonium hydroxide, potassium hydroxide, or sodium hydroxide, and in an amount in excess of that chemically equivalent to react with the excess of the water soluble zinc salt previously added, and sufficient to bring the aqueous suspension to a pH value between 8.0 and 9.5.

It is important in preparing the aqueous suspension that the water soluble zinc salt be added as a solution and rapidly, e.g. all at once, to the heated and vigorously stirred dilute solution of the alkali carbonate, and that reaction of said ingredients in the hot aqueous solution be followed almost immediately by addition of the alkali hydroxide to convert the remaining zinc salt to the corresponding zinc hydroxide and to bring the aqueous suspension to a pH value of from 8.0 to 9.5. It is also important that the ratio, i.e. the theoretical ratio of the zinc carbonate to zinc hydroxide in the alkaline aqueous suspension be within the range of from 1 to 4 parts by weight of the zinc carbonate per part by weight of zinc hydroxide.

Small amounts of anionic, cationic or amphoteric surface active agents can advantageously be incorporated into the aqueous suspension, but they are not required.

The aqueous suspension is suitable for preparing polymer beads by polymerizing a liquid vinyl aryl monomer such as styrene, vinyltoluene, vinylxylene, ethylvinylbenzene, isopropylstyrene, tert.-butyl styrene, chlorostyrene, di-chlorostyrene, fluorostyrene, or mixtures of any two or more of such monomers, or mixtures of any one or more of such monomers and one or more other copolymerizable monomers such as methyl methacrylate, acrylonitrile, or alpha-methylstyrene.

In preparing polymer beads, or polymer particles in bead like or spherical form, a vinyl aryl monomer e.g. styrene, or a liquid mixture of monomers comprising one or more vinyl aryl monomers and other ethylenically unsaturated monomers copolymerizable therewith, is dispersed in the stabilized aqueous medium, i.e. the aqueous medium containing the basic zinc carbonate and the zinc hydroxide. The monomer is used, suitably in amounts corresponding to about 0.4 to 4 parts by weight of the aqueous suspension per part by weight of the monomer, although a ratio of the aqueous suspension to monomer of from about 0.8:1 to 2:1 is preferred.

The mixture is stirred and heated at elevated polymerization temperatures of from about 60° to 150° C. and at atmospheric, subatmospheric, or superatmospheric pressure, suitably under the autogeneous pressure of the mixture of the reactants at the temperature employed, when carrying out the polymerization in a closed pressure resistant vessel.

The polymerization is advantageously carried out in admixture with a polymerization initiator or catalyst such as α,α'-azobisisobutyronitrile, or a peroxy compound such as benzoyl peroxide, cumene peroxide, di-tert.-butyl peroxide, tert.-butyl peracetate, di-tert.-butyl diperphthalate, tert.-butylperoxy isopropyl carbonate, tert.-butyl perbenzoate, 2,5-dimethyl-2,5-di-(tert.-butylperoxy) hexane, or 2,5-dimethlyl-2,5-di(tert.-butyl-peroxy) hexyne-3. Mixtures of such polymerization initiators or catalysts can also be used.

In a preferred practice, the polymerization is carried out in the presence of, and in admixture with, a plurality of at least three catalysts such as a mixture of α,α'-azobisisobutyronitrile, benzoyl peroxide, and tert.-butyl perbenzoate, or a mixture of α,α'-azobisisobutyronitrile, benzoyl peroxide and tert.-butylperoxy isopropyl carbonate, in which mixture the respective catalysts act together and sucessively, because of their overlapping decomposition temperatures and half life, during the polymerization.

The aqueous medium and the process described for making polymer beads is also suitable for making foamable polymer beads. In such case, after polymerization of the monomer to form beads is complete or substantially complete, it is only required that a volatile organic hydrocarbon blowing agent, e.g. pentane, isopentane, neopentane, petroleum ether, hexane or heptane, boiling at temperatures between about 10° and 100° C., be added to the suspension of the polymer beads and be integrated therewith, under pressure and at temperatures between about 60° and 150° C., after which the suspension is cooled to about 40° C. or below, and the vessel is opened and the polymer product recovered.

The following examples illustrate ways in which the principle of the invention has been applied but are not to be construed as limiting its scope.

Example 1

(A) A charge of 4.3 grams of sodium carbonate and one liter of demineralized water was placed in a 4-liter glass reaction vessel equipped with an impeller type agitator 3-inches long and a reflux condenser. The mixture was stirred by rotating the agitator at a speed of 600 revolutions per minute. The solution was heated to 180° F. Thereafter, a solution of 15.5 grams of zinc nitrate, $Zn(NO_3)_2 \cdot 4H_2O$, dissolved in 200 ml. of water was added all at once to the hot, stirred, solution of the sodium carbonate. A white precipitate was obtained. A solution of 2.5 grams of sodium hydroxide dissolved in 50 ml. of water was added. After stirring for about 10 minutes, a charge of 10 grams of sodium betanaphthalene sulfonate was added. The resulting mixture was an aqueous medium having a pH of 9.3 and was suitable for the suspension polymerization of styrene to form polymer beads.

(B) To the aqueous suspension prepared in part A above, there was added 1250 grams of monomeric styrene, 1.25 grams of $\alpha,\alpha'$-azobisisobutyronitrile, 0.625 gram of benzoyl peroxide and 1.125 grams of tert-butylperoxy isopropyl carbonate. The resulting mixture was stirred and heated under polymerization conditions as follows: 6 hours at 80° C.; 5 hours at 87° C.; and 3 hours at 95° C. Thereafter, the mixture was cooled. The aqueous medium was made acidic to a pH of 1 with hydrochloric acid, after which the polymer product in the form of beads was separated by filtering and was washed with water and was dried in air at 70° C. A portion of the product was subjected to a screening analysis to determine the percent by weight of the polymer of given sizes. The result was as follows:

| U.S. Standard screen mesh size: | Parts by weight |
|---|---|
| 16 | 0.5 |
| 20 | 10.5 |
| 25 | 11.2 |
| 30 | 8.7 |
| 35 | 9.8 |
| 40 | 20.1 |
| 50 | 15.2 |
| 60 | 14.5 |
| Pan | 9.5 |
| | 100.0 |

For purpose of comparison, the above example was repeated, except that no sodium hydroxide was used and the inorganic zinc suspending agent was prepared by reacting in the hot aqueous solution 5.91 grams of sodium carbonate and 14.6 grams of zinc nitrate $Zn(NO_3)_2 \cdot 4H_2O$. The aqueous suspension medium had a pH of 8.90. The suspension polymerization was unstable and resulted in phase separation. It was inoperable to make polymer beads using only the freshly prepared hot-precipitated basic zinc carbonate without excess of hydroxide.

For purpose of further comparison the example was repeated, except using zinc hydroxide alone, and prepared by reacting 18.4 grams of zinc nitrate $Zn(NO_3)_2 \cdot 4H_2O$ in solution with 6.62 grams of sodium hydroxide. This aqueous suspension medium had a pH of 10.85. It was inoperable to make polymer beads, and resulted in phase separation during the suspension polymerization.

Example 2

Example 1 was repeated, except using an aqueous suspension medium prepared from 5.95 grams of sodium carbonate, 21.8 grams of zinc nitrate, $Zn(NO_3)_2 \cdot 4H_2O$, and 3.5 grams of sodium hydroxide, which aqueous medium had a pH of 9.55. The polymer product was in the form of beads of sizes as follows:

| U.S. Standard screen mesh size: | Parts by weight |
|---|---|
| 16 | 0.7 |
| 20 | 4.3 |
| 25 | 4.0 |
| 30 | 3.8 |
| 35 | 8.1 |
| 40 | 17.2 |
| 50 | 27.0 |
| 60 | 19.0 |
| Pan | 15.9 |
| | 100.0 |

Example 3

Example 2 was repeated, except using 10 grams of an aqueous 0.15 weight percent solution of sodium polyacrylate, 1 gram of an aqueous 0.33 weight percent solution of partial sodium salt of N-lauryl beta-iminodipropionate (an amphoteric surface active agent), and 9 grams of an aqueous 1 weight percent solution of "Deriphat 154", disodium salt of N-tallow beta-aminodipropionate (an amphoteric surface active agent, see U.S. Patent No. 2,876,259) in place of the betanaphthalene sulfonate (anionic surface active agent) used in said example. The polymer product was in the form of beads of sizes as follows:

| U.S. Standard Screen mesh size: | Parts by weight |
|---|---|
| 16 | 0.0 |
| 20 | 1.0 |
| 25 | 4.7 |
| 30 | 10.7 |
| 35 | 10.8 |
| 40 | 18.3 |
| 50 | 29.4 |
| 60 | 11.5 |
| Pan | 13.6 |
| | 100.0 |

Example 4

The experiment of Example 1 was repeated using 12.5 grams of freshly made hot-precipitated basic zinc carbonate and 5.4 grams of zinc hydroxide formed in situ as the suspension stabilizing agents and without the addition of any surface active agent. The polymer product was in the form of beads of sizes as follows:

| U.S. Standard screen mesh size: | Parts by weight |
|---|---|
| 16 | 0.2 |
| 20 | 4.1 |
| 25 | 3.6 |
| 30 | 4.4 |
| 35 | 3.4 |
| 40 | 9.9 |
| 50 | 42.0 |
| 60 | 15.9 |
| Pan | 16.5 |
| | 100.0 |

Example 5

Example 4 was repeated using 15 grams of basic zinc carbonate and 3.375 grams of zinc hydroxide, prepared by procedure described in Example 1, as the suspension stabilizing agent and without any surface active agent. The polymer product was in the form of heads of sizes as follows:

| U.S. Standard screen mesh size: | Parts by weight |
|---|---|
| 10 | 0.9 |
| 14 | 2.1 |
| 16 | 2.9 |
| 20 | 9.6 |
| 25 | 16.4 |
| 30 | 22.9 |
| 35 | 14.5 |
| 40 | 14.2 |
| 50 | 10.7 |
| 60 | 2.5 |
| Pan | 3.3 |
| | 100.0 |

Example 6

In each of two experiments, a stable aqueous medium suitable for the suspension polymerization of styrene to form polymer beads was prepared as follows: a charge of 23 pounds of demineralized water and 0.158 (0.00149 mole) pound of sodium carbonate, $Na_2CO_3$, were placed in a 10 gallon glass-lined reaction vessel equipped with a stirrer and jacket means for heating and cooling the same. The mixture was stirred and was heated to a temperature of 190° F. Thereafter, a solution of 0.578 pound of zinc nitrate $Zn(NO_3)_2 \cdot 4H_2O$ (0.00221 mole) dissolved in 400 ml. of demineralized water was added. The resulting mixture was stirred and heated for 15 minutes, after which there was added a solution of 0.093 pound (0.00232 mole) of sodium hydroxide, dissolved in 100 ml. of demineralized water. The mixture was stirred and heated for 15 minutes, after which there was added 0.272 pound of an aqueous 1 weight percent solution of "Deriphat 154," a disodium salt of N-tallow beta-amino dipropionate (an amphoteric surface active agent. See U.S. Patent No. 2,876,259), 0.0272 pound of an aqueous 0.33 weight percent solution of "Deriphat 160C," partial sodium salt of N-lauryl beta-iminodipropionate (an amphoteric surface active agent), and 9.1 pounds of water. The aqueous medium had a pH of 8.2. Stirring and heating of the aqueous medium was continued while adding 33.2 pounds of monomeric styrene and 0.0332 pound (0.01% by weight) of $\alpha,\alpha$-azobisisobutyronitrile, 0.0232 pound (0.007%) of benzoyl peroxide, and 0.0166 pound (0.005%) of tert.-butylperoxy isopropyl carbonate, as the three component polymerization initiator or catalyst. Thereafter, the resulting mixture was stirred and heated in the closed reaction vessel under time and temperature polymerization conditions as follows: 7 hours at 80° C.; 5 hours at 90° C.; and 2 hours at 110° C. The vessel was opened. The aqueous suspension was made acidic to a pH of 1.0 by adding a dilute, e.g. a 6 normal, aqueous solution of hydrochloric acid thereto while stirring. The polymer product in the form of discrete particles was recovered by filtering and was washed with water, then was dried in air at a temperature of 70° C. for a period of 5 hours. A test portion of the polymer product was screened through U.S. Standard screens to determine the percentage of polymer particles of different screen sizes in the product, when using different degrees of agitation during the polymerization. In experiment A the agitator of the reaction vessel was rotated at a speed of 182 revolutions per minute. In Experiment B the agitator was rotated at a speed of 260 revolutions per minute. The polymer products were in the form of beads of sizes as follows:

TABLE I

| | Test No. | |
|---|---|---|
| | A | B |
| | Agitator speed, r.p.m. | |
| Screen No: | 182 | 260 |
| 16 | 0.6 | |
| 20 | 7.1 | 0.5 |
| 25 | 4.0 | 4.3 |
| 30 | 21.2 | 14.4 |
| 35 | 14.5 | 13.2 |
| 40 | 20.2 | 21.6 |
| 50 | 22.6 | 20.8 |
| 60 | 5.8 | 15.1 |
| Pan | 4.0 | 10.1 |
| | 100.0 | 100.0 |

Example 7

A charge of 2450 pounds of demineralized water was placed in a glass lined steel reaction vessel equipped with a stirrer and jacket means for heating and cooling the same. The stirrer was rotated at a speed of 130 revolutions per minute. Steam was fed to the jacket of the vessel at about 75 pounds per square inch gauge pressure while heating the water in the vessel to a temperature of 140° F. Thereafter, a charge of 8.36 pounds of powdered sodium carbonate, was added all at once to the hot water. Stirring and heating of the mixture was continued. When the temperature of the aqueous solution was 194° F., the speed of the stirrer was increased to 150 r.p.m. The pH of the solution was found to be 9.8. Thereafter, a solution of 66.8 pounds of demineralized water containing 33.4 pounds of zinc nitrate, $Zn(NO_3)_2$, was added all at once, i.e. over a 2 second period of time, to the stirred hot solution of sodium carbonate in the reaction vessel. A test portion of the resulting mixture showed it to contain a heavy fast settling "fluff."

The aqueous mixture had a pH of 5.5. The mixture was stirred and maintained at a temperature of 194° F. After 20 minutes, i.e, twenty minutes after adding the zinc nitrate solution to the vessel, there was added a solution of 16.14 pounds of demineralized water and 5.38 pounds of sodium hydroxide. The mixture was stirred for 15 minutes. A solution of 20 pounds of demineralized water and 0.186 pound of "Deriphat 154," an amphoteric surface active agent having the general formula $RN(CH_2CH_2COONa)_2$ wherein R represents the mixed alkyl groups of the fatty acids of tallow, (see U.S. Patent No. 2,876,259) was added. After 5 minutes the stirrer speed was reduced to 90 r.p.m. Thereafter, a charge of 3100 pounds of styrene monomer was added. After, adding the styrene monomer to the reaction vessel, there was added 4.65 pounds of $\alpha,\alpha'$azobisisobutyronitrile, 4.65 pounds of benzoyl peroxide and 2.32 pounds of tert.-butylperoxy isopropyl carbonate as polymerization catalysts, and in the order named. The resulting mixture was stirred at 90° r.p.m. and was heated at 176° F. for a period of 1 hour, then at 194° F. for 5 hours, then at 230° F. for 2 hours, and finally at 254° F. for 2 hours, after which it was cooled to 140° F. A test portion of the polymer was withdrawn from the vessel through a bottom valve. Thereafter, the reaction vessel contaniing the polymer beads and the aqueous liquid is pressurized with nitrogen to 30 p.s.i.g., after which normal pentane was added to the stirred mixture as blowing agent in an amount corresponding to about 326 pounds and over a period of about 2 hours. After adding the pentane, the vessel was pressurized with nitrogen to 85 p.s.i.g. Stirring was continued while heating the mixture at a temperature of 176° F. for a period of 6 hours. Thereafter, the mixture was cooled to 80° F. under pressure. The vessel was opened. The polymer product was recovered by filtering. The polymer beads were reslurried in water made acidic with hydrochloric acid to a pH of 1, to remove zinc hydroxide clinging to surfaces of the polymer beads, and were washed with water, after which they were dried in air at room temperature. The product weighed 3268 pounds and was in the form of free-flowing beads containing 7 percent by weight of the pentane blowing agent dissolved therein. The beads foamed to a cellular body upon heating to a temperature above the softening point of the polystyrene. They can be heated in a mold to form useful articles, e.g. cups. The product was in the form of beads of sizes as follows:

| U.S. Standard screen mesh size: | Parts by weight |
|---|---|
| 10 | ---- |
| 14 | 4.6 |
| 16 | 8.4 |
| 20 | 35.0 |
| 25 | 22.9 |
| 30 | 13.1 |
| 35 | 6.1 |
| 40 | 5.6 |
| 50 | 3.3 |
| 60 | .6 |
| Pan | .4 |
| | 100.0 |

We claim:

1. A process for preparing polymer beads which comprises polymerizing a vinyl aryl monomer in an aqueous suspension stabilized with a mixture of finely divided basic zinc carbonate and zinc hydroxide, prepared by reaction in an aqueous solution at temperatures between 100° F. and 212° F. of an alkali carbonate with an excess of a water soluble inorganic zinc salt and of an alkali hydroxide in excess of that theoretically required to react with the excess zinc salt, the theoretical ratio of zinc carbonate to zinc hydroxide being from 1 to 4 parts by weight of zinc carbonate per part by weight of zinc hydroxide, and said excess of said alkali hydroxide being sufficient to bring the pH of said aqueous suspension to a value between 8.0 and 9.5.

2. A process as claimed in claim 1, wherein the vinyl aryl monomer is styrene.

3. A process as claimed in claim 1, wherein the aqueous suspension contains an anionic surface active agent.

4. A process as claimed in claim 3, wherein the surface active agent is an alkylamino propionate having the formula $RN(CH_2CH_2COONa)_2$ wherein R is the mixed alkyl group of the fatty acids of tallow.

5. A process for preparing polymer beads suitable for foaming into cellular bodies, which comprises polymerizing a vinyl aryl monomer in an aqueous suspension stabilized with a mixture of finely divided basic zinc carbonate and zinc hydroxide, prepared by reaction in an aqueous solution at temperatures between 100° F. and 212° F. of an alkali carbonate with an excess of a water soluble inorganic zinc salt and of an alkali hydroxide in excess of that theoretically required to react with the excess zinc salt, the theoretical ratio of zinc carbonate to zinc hydroxide being from 1 to 4 parts by weight of zinc carbonate per part by weight of zinc hydroxide, and said excess of said alkali hydroxide being sufficient to bring the pH of said aqueous suspension to a value between 8.0 and 9.5, until at least 70 percent by weight of the monomer is polymerized, then adding to the aqueous suspension a volatile aliphatic hydrocarbon boiling between 10 and 100° C. and continuing heating of the mixture to substantially complete polymerization of the monomer and integrate said hydrocarbon with the polymer.

6. A process as claimed in claim 5, wherein the vinyl aryl monomer is styrene.

7. A process as claimed in claim 5, wherein the volatile aliphatic hydrocarbon contains five carbon atoms in the molecule.

References Cited

UNITED STATES PATENTS

| | | | |
|---|---|---|---|
| 1,866,775 | 7/1932 | Oehme | 23—55 |
| 3,192,169 | 6/1955 | Doak. | |
| 3,328,374 | 6/1967 | Ronden et al. | |

FOREIGN PATENTS

| | | |
|---|---|---|
| 540,924 | 5/1957 | Canada. |

MURRAY TILLMAN, Primary Examiner

W. J. BRIGGS, Sr., Assistant Examiner

U.S. Cl. X.R.

23—55, 61, 183; 260—85.5, 86.7, 88.1, 88.2, 93.5